US011752679B2

(12) United States Patent
Brew et al.

(10) Patent No.: US 11,752,679 B2
(45) Date of Patent: Sep. 12, 2023

(54) HONEYCOMB EXTRUSION DIES AND FORMING METHODS

(71) Applicant: CORNING INCORPORATED, Corning, NY (US)

(72) Inventors: Thomas William Brew, Corning, NY (US); Yuehao Li, Painted Post, NY (US); Min Shen, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 239 days.

(21) Appl. No.: 17/058,397

(22) PCT Filed: May 30, 2019

(86) PCT No.: PCT/US2019/034553
§ 371 (c)(1),
(2) Date: Nov. 24, 2020

(87) PCT Pub. No.: WO2019/232150
PCT Pub. Date: Dec. 5, 2019

(65) Prior Publication Data
US 2021/0308928 A1 Oct. 7, 2021

Related U.S. Application Data (60) Provisional application No. 62/678,755, filed on May 31, 2018.

(51) Int. Cl.
| | | |
|---|---|---|
| *B29C 48/11* | (2019.01) | |
| *B28B 3/26* | (2006.01) | |
| *B29C 48/30* | (2019.01) | |
| *B23P 15/24* | (2006.01) | |
| *B29L 31/60* | (2006.01) | |

(52) U.S. Cl.
CPC ............ *B29C 48/11* (2019.02); *B23P 15/243* (2013.01); *B28B 3/269* (2013.01); *B29C 48/3001* (2019.02); *B29L 2031/608* (2013.01)

(58) Field of Classification Search
CPC .. B23P 15/243; B28B 3/269; B28B 2003/203; B29L 2031/608; B29C 66/7254; B29C 66/72525; B29C 48/11; B29C 48/00
See application file for complete search history.

(56) References Cited

U.S. PATENT DOCUMENTS

| | | |
|---|---|---|
| 4,298,328 A | 11/1981 | Frost |
| 4,349,329 A | 9/1982 | Naito et al. |

(Continued)

FOREIGN PATENT DOCUMENTS

| | | |
|---|---|---|
| JP | 05-131427 A | 5/1993 |
| JP | 3121409 B2 | 12/2000 |

(Continued)

OTHER PUBLICATIONS

International Search Report and Written Opinion of the International Searching Authority; PCT/US19/034553; dated Sep. 11, 2019; 12 Pages; European Patent Office.

*Primary Examiner* — Susan D Leong
*Assistant Examiner* — John W Hatch
(74) *Attorney, Agent, or Firm* — Joseph M. Homa (57) ABSTRACT

A honeycomb extrusion die (120) includes a die body (302) including an inlet face (306) and an exit face. The die body (302) has slot inlets (309) and a plurality of pins (320, 500) disposed between the slot inlets (309) and the exit face. The plurality of pins (320, 500) include side surfaces (322, 500B) configured to define a matrix of intersecting slots (324), wherein the matrix of intersecting slots (324) has slot exit (509) widths at the exit face. Divots (526) extend into a plurality of the side surfaces (322, 500B) between the slot inlets (309) and the exit face. Each individual divot (526) has a divot depth (D55) extending into a side surface (500A, 500B, 502A, 502B) of the side surfaces (322, 500B). A ratio between a slot exit width (W53) W53 of an individual slot (324) and the divot depth (D55) of an individual divot (526)

(Continued)

extending into a side surface (500A, 500B, 502A, 502B) of the individual slot (324) is greater than 1.2. Methods of forming honeycomb bodies with honeycomb structures are provided, as are other aspects.

14 Claims, 6 Drawing Sheets (56) References Cited

U.S. PATENT DOCUMENTS

| | | | |
|---|---|---|---|
| 6,299,813 B1 * | 10/2001 | Brew | B28B 3/269 |
| | | | 264/209.8 |
| 6,558,151 B1 | 5/2003 | Kragle | |
| 2008/0124423 A1 | 5/2008 | Peterson et al. | |
| 2011/0052745 A1 | 3/2011 | Corbett et al. | |
| 2012/0045973 A1 * | 2/2012 | Folmar | B23H 5/04 |
| | | | 451/48 |
| 2015/0086670 A1 * | 3/2015 | Kitamura | B23P 15/243 |
| | | | 425/461 |
| 2017/0120498 A1 | 5/2017 | Brew et al. | |
| 2017/0266743 A1 | 9/2017 | Forenz et al. | |

FOREIGN PATENT DOCUMENTS

| | | | | |
|---|---|---|---|---|
| WO | 99/20445 A1 | 4/1999 | | |
| WO | 01/21379 A1 | 3/2001 | | |
| WO | WO-0121379 A1 * | 3/2001 | | B28B 3/269 |
| WO | 2017/139753 A1 | 8/2017 | | |

* cited by examiner

HONEYCOMB EXTRUSION DIES AND FORMING METHODS

This is a national stage application under 35 U.S.C. § 371 of International Application No. PCT/US2019/034553, filed May 30, 2019 which claims the benefit of priority under 35 U.S.C. § 119 of U.S. Provisional Application Ser. No. 62/678,755 filed on May 31, 2018, the content of which is incorporated herein by reference in their entireties.

FIELD

Embodiments of the disclosure relate to honeycomb extrusion dies, and in particular to honeycomb extrusion dies comprising slots with divots extending into side surfaces of the slots and methods of forming honeycomb bodies therefrom.

BACKGROUND

Honeycomb extrusion dies are used to extrude honeycomb structures that can be utilized in exhaust after-treatment systems, such as catalytic converters and particulate filters.

SUMMARY

An example embodiment of the disclosure provides a honeycomb extrusion die.

Another example embodiment of the disclosure provides a honeycomb extrusion die comprising a plurality of die pins arranged to form an array of slots, wherein one or more side surfaces of the die pins comprise a relatively-shallow divot.

Another example embodiment of the disclosure provides a honeycomb extrusion die comprising a plurality of die pins arranged to form an array of slots, wherein one or more side surfaces of the die pins comprise a relatively-shallow divot and a plenum.

Another example embodiment of the disclosure provides a honeycomb extrusion die comprising a die body comprising an inlet face and an exit face, the die body having slot inlets and a plurality of pins disposed between the slot inlets and the exit face, the plurality of pins comprising side surfaces configured to define a matrix of intersecting slots, the matrix of intersecting slots having slot exit widths at the exit face; divots extending into a plurality of the side surfaces between the slot inlets and the exit face, each individual divot having a divot depth extending into a side surface of the side surfaces; and a ratio between a slot exit width of an individual slot and the divot depth of an individual divot extending into a side surface of the individual slot is greater than 1.2.

Another example embodiment of the disclosure provides a honeycomb extrusion die comprising a die body having an inlet face and an exit face, the die body having slot inlets and a plurality of pins disposed between the slot inlets and the exit face, the plurality of pins comprising side surfaces configured to define a matrix of intersecting slots; divots extending into a plurality of the side surfaces between the slot inlets and the exit face, each individual divot having a divot depth and divot length extending into a side surface of the side surfaces; and a ratio between a divot length and a divot depth of an individual divot is greater than 3.0.

Another example embodiment of the disclosure provides a honeycomb extrusion die comprising a die body comprising an inlet face and an exit face, the die body having slot inlets and a plurality of pins disposed between the slot inlets and the exit face, the plurality of pins comprising side surfaces configured to define a matrix of intersecting slots, the matrix of intersecting slots having slot exit widths; divots extend into a plurality of the side surfaces between the slot inlets and the exit face, each individual divot having a divot depth and divot length extending into a side surface of the side surfaces; a ratio between the divot length and the divot depth of an individual divot is greater than 3.0; and a ratio between a slot exit width of an individual slot and the divot depth of a divot extending into a side wall of the individual slot is greater than 1.2.

Another example embodiment of disclosure provides a method of forming a honeycomb body comprising, providing a die body comprising: an inlet face and an exit face, the die body having slot inlets and a plurality of pins disposed between the slot inlets and the exit face, the plurality of pins comprising side surfaces configured to define a matrix of intersecting slots, the matrix of intersecting slots having slot exit widths; divots extending into a plurality of the side surfaces between the slot inlets and the exit face, each individual divot having a divot depth and divot length extending into a side surface of the side surfaces; a ratio between the divot length and the divot depth of an individual divot is greater than 3.0; and a ratio between a slot exit width of an individual slot and the divot depth of a divot extending into a side wall of the individual slot is greater than 1.2; and extruding a batch material through the die body.

Additional features of the disclosure will be set forth in the description which follows, and in part will be apparent from the description, or may be learned by practice of the disclosure. It is to be understood that both the foregoing general description and the following detailed description are explanatory and are intended to provide further explanation of the disclosure.

BRIEF DESCRIPTION OF THE DRAWINGS

The accompanying drawings, which are included to provide a further understanding of the disclosure are incorporated in and constitute a part of this specification, illustrate embodiments of the disclosure and together with the description serve to explain the disclosure.

DETAILED DESCRIPTION

After-treatment of exhaust gas from internal combustion engines may use catalysts supported on high-surface area substrates and, in the case of diesel engines and some gasoline direct injection engines, a catalyzed or uncatalyzed filter for the removal of particles from the exhaust stream. Filters and catalyst supports in these applications may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters can be made utilizing the "honeycomb bodies" described herein.

A honeycomb structure can be formed from a batch mixture, for example, a ceramic-forming batch composition, comprising ceramic-forming materials that may comprise ceramics or ceramic precursors, or both, an organic binder(s), a liquid vehicle, and an optional pore former, rheology modifier, and the like. After honeycomb structure formation (e.g., via extrusion) and firing, the formed ceramic-forming batch composition is transformed or sintered into a porous ceramic material, for example, an open and interconnected porous ceramic honeycomb structure suitable for exhaust after-treatment purposes. The ceramic may be, for example, cordierite, aluminum titanate, alumina, mullite, silicon carbide, silicon nitride, and the like, and combinations thereof. Other suitable ceramics may be used. Moreover, in some embodiments, porous metals may be used.

The honeycomb structure can, in some embodiments, be formed by an extrusion method where a ceramic-forming batch material is extruded into a green honeycomb structure, dried, and fired to form the final ceramic honeycomb structure. The extrusion can be performed using any suitable extruder, such as a hydraulic ram extrusion press, a two stage de-airing single auger extruder, a twin-screw extruder, or the like, each with an extrusion die of a die assembly attached to the discharge end thereof.

Honeycomb extrusion dies employed to produce such honeycomb bodies can be multi-component assemblies including, for example, a wall-forming die body combined with a skin-forming mask. For example, U.S. Pat. Nos. 4,349,329 and 4,298,328 disclose die structures including skin-forming masks. The die body may incorporate batch feedholes leading to, and intersecting with, an array of discharge slots formed in the die face, through which the ceramic-forming batch material is extruded. The die body may comprise a plurality of die pins, wherein spaces between side surfaces of the pins form the array of discharge slots. The extrusion method forms an interconnecting array of intersecting walls forming a honeycomb structure. A mask can be employed to form an outer peripheral skin, and the mask can be a ring-like circumferential structure, such as in the form of a collar, defining the periphery of the skin of the honeycomb structure. The circumferential skin layer of the honeycomb structure can be formed by extruding the ceramic-forming batch material between the mask and a main portion of the honeycomb die.

In other embodiments, it may be desirable to remove the external surface and thereafter apply skin-forming cement to the external surface. For example, a green extruded honeycomb structure may be shaped to a desired shape and size by removing the extruded external surface. Alternatively, the green honeycomb structure may be fired and then ground to the desired external shape and size by removing the external extruded surface and a suitable portion of the porous wall structure to attain the desired shape and size. Shaping can be accomplished by any means known in the art, comprising cutting, sanding, or grinding away the external extruded surface of the honeycomb structure to achieve the desired shape and size. After-applied skin may be applied by any suitable method.

Extrusion dies are disclosed herein that enable high feed rate of the batch material through the extrusion dies. Two factors that may determine extrusion die performance that are addressed herein are extrusion die pressure and extrusion die sensitivity. Extrusion die pressure is the pressure across an extrusion die during extrusion and may be related to the pressure exerted on the batch material to force the batch material through the extrusion die at a specific or predetermined flowrate (e.g., flow velocity). An extrusion die with too high of an extrusion die pressure can severely limit the extrusion throughput and flowrate. Extrusion die sensitivity is the ability of the extrusion die to extrude an extrudate without being substantially affected by fluctuations of the forming process (e.g., rheology and temperature) to ensure consistent quality in the extrudate.

Some extrusion dies comprise divots in the side surfaces of the die pins. These divots are sometimes referred to as being "divots in the slots." The divots operate to lower the extrusion die sensitivity against process fluctuations as compared to extrusion dies without divots. For example, the divots may be used to ensure adequate knitting strength of the batch material in the slots of extrusion dies having short die pin lengths. The divots, however, may result in significant increases in extrusion die pressures in some cases. In some extrusion die embodiments, long and deep divots are used to enhance die extrusion stability, but these divots can further increase the extrusion die pressure and lower the extrusion flowrate. Traditional divots typically have length/depth ratios of about 2:1 and the minimum depth of the divots into the side surfaces of the die pins in these embodiments is greater than 4.0 mils (0.10 mm).

Other embodiments of extrusion dies comprise plenums formed in or proximate the slots inlets, which are located at the outlets of the feedholes. The plenums may provide pressure benefits, such as lower extrusion die pressure as compared to extrusion dies without plenums. Extrusion dies that comprise plenums can have higher batch flowrates and/or longer extrusion die life. Extrusion dies comprising plenums may have varying stability depending on the plenum design (e.g., plenum length and width), batch rheology, and wall drag. However, extrusion dies including plenums have disadvantages when the slots have wide discharge widths (sometimes referred to as a "halo cuts"). Some embodiments of extrusion dies including plenums and halo cuts however do not provide an appropriate impedance profile in order to balance the batch flow in a nominal array of slots including the halo cuts. These extrusion dies may cause web defects and knitting issues in the periphery of the green honeycomb extrudate in some cases, which may cause lower isostatic (ISO) strength of the finished honeycomb product.

Traditional extrusion dies including divots and plenums may have slightly lower extrusion die pressure as compared to extrusion dies with divots, but without plenums. Extrusion die sensitivity of these extrusion dies can however be lower than that of extrusion dies with plenums, but without divots. However, these extrusion dies still have extrusion die pressures much higher than traditional extrusion dies without plenums and without divots because the divots can significantly increase extrusion die pressure.

Accordingly, embodiments of extrusion dies disclosed herein comprise plenums and relatively-shallow divots in the side surfaces of pins forming the slots and may comprise halo cuts. The extrusion dies disclosed herein advantageously lower die pressures to enable relatively high flow rates while also achieving the same or lower die sensitivity than traditional extrusion dies. In some embodiments, the plenums and relatively-shallow divots enable flow rates to be increased by as much as 75%. Unlike traditional extrusion dies including plenums and deep divots, the extrusion dies disclosed herein comprise relatively-shallow divots, which reduce extrusion die pressure as compared to traditional dies having traditional divots. In some embodiments, the depths of the divots as measured from the side surfaces of the die pins are less than 2 mils (50 μm). Thus, the relatively-shallow divots disclosed herein provide lower extrusion die pressure than the traditional divots. More specifically, the relatively-shallow divots only add a moderate extrusion die pressure increase to the extrusion die during extrusion.

These and other embodiments of extrusion dies and honeycomb structure forming methods according to the present disclosure are described below with reference to FIGS. 1-7 herein. Like reference numerals used in the drawings identify similar or identical elements throughout the several views. The drawings are not necessarily drawn to scale.

Figure 1:
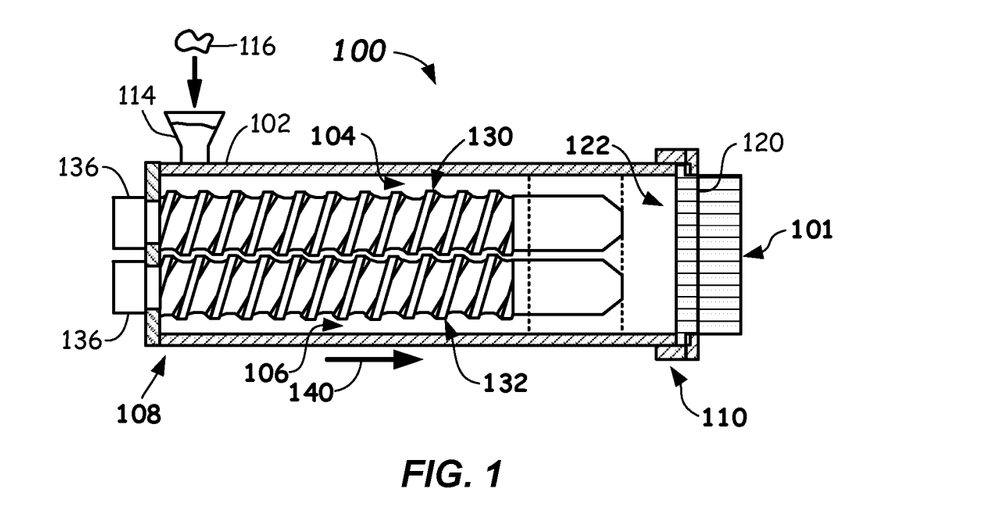
FIG. 1 illustrates a partially-cross sectioned, side plan view schematic diagram of an extruder (e.g., twin-screw extruder) including an extrusion die according to embodiments.

Reference is now made to FIG. 1, which shows a side cross-sectioned side view of an embodiment of an extruder 100 (e.g., a continuous twin-screw extruder). The extruder 100 comprises a barrel 102 comprising a first chamber portion 104 and a second chamber portion 106 formed therein and in communication with each other. The barrel 102 can be monolithic or it can be formed from a plurality of barrel segments connected successively in the longitudinal (e.g., axial) direction. The first chamber portion 104 and the second chamber portion 106 extend through the barrel 102 in the longitudinal direction between an upstream side 108 and a downstream side 110. At the upstream side 108 of the barrel 102, a material supply port 114, which can comprise a hopper or other material supply structure, may be provided for supplying a batch material 116 to the extruder 100. A honeycomb extrusion die 120 is provided at a discharge port 122 at the downstream side 110 of the barrel 102 for extruding the batch material 116 into a desired shape, such as green honeycomb structure 101 or the like. The honeycomb extrusion die 120 may be coupled with respect to the discharge port 122 of the barrel 102, such as at an end of the barrel 102. The honeycomb extrusion die 120 can be preceded by other extrusion components, such as a generally open cavity (not shown), screen/homogenizer (not shown), or the like to facilitate the formation of a steady plug-type flow front before the batch material 116 reaches the honeycomb extrusion die 120.

As shown in FIG. 1, a pair of extruder screws can be mounted in the barrel 102. A first screw 130 is rotatably mounted at least partially within the first chamber portion 104 and a second screw 132 is rotatably mounted at least partially within the second chamber portion 106. The first screw 130 and the second screw 132 may be arranged generally parallel to each other, as shown, though they may also be arranged at various angles relative to each other. The first screw 130 and the second screw 132 may also be coupled to a driving mechanism outside of the barrel 102 for rotation in the same or different directions. It is to be understood that both the first screw 130 and the second screw 132 may be coupled to a single driving mechanism (not shown) or, as shown, to individual driving mechanisms 136. The first screw 130 and the second screw 132 move the batch material 116 through the barrel 102 with pumping and mixing action in an axial direction 140. Further supporting structure (shown dotted) may be provided to support the first screw 130 and the second screw 132 along their lengths. Such support structure may comprise perforations or holes therein to allow the batch material 116 to flow there through.

Figure 2:
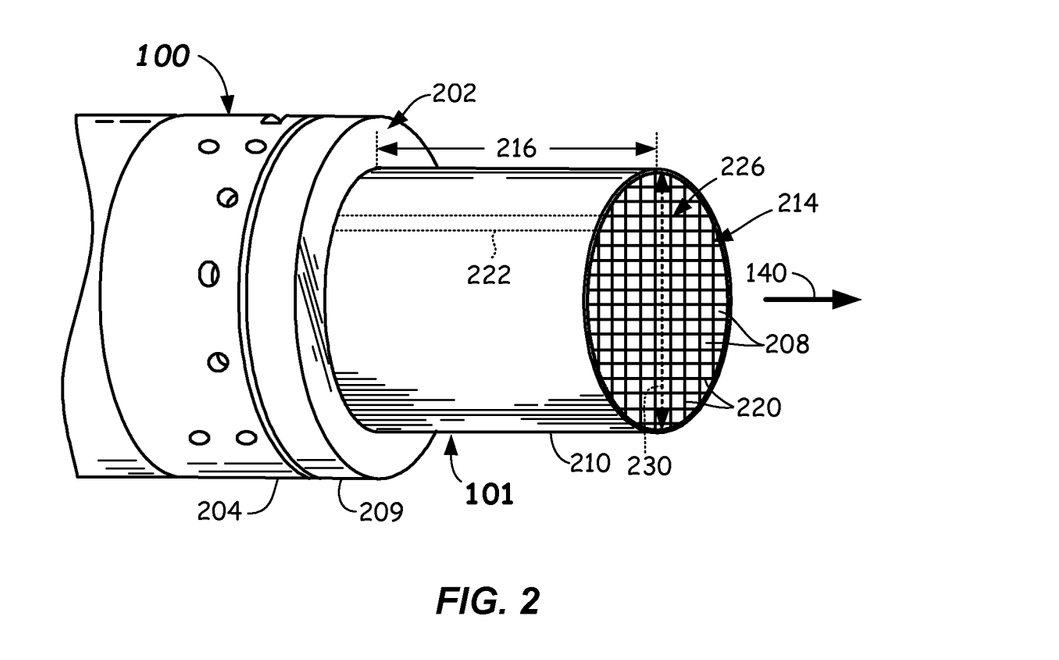
FIG. 2 illustrates a perspective, partial view diagram of an extruder front end and a green honeycomb structure being extruded therefrom according to embodiments.

FIG. 2 is a perspective illustration showing an end of the extruder 100 and a green honeycomb structure 101 (e.g., an extrudate) being extruded therefrom. The extruder 100 is shown with an extruder front end 202 being where the batch material 116 exits the extruder 100 as the green honeycomb structure 101. An extruder cartridge 204 located proximate the extruder front end 202 may comprise extrusion hardware such as the honeycomb extrusion die 120 (FIG. 1) and a skin forming mask 209. The green honeycomb structure 101 comprises a first end face 214 and a length 216 extending between the extruder front end 202 and the first end face 214.

The green honeycomb structure 101 can comprise a plurality of channels 208 and an outer peripheral surface 210. A plurality of intersecting walls 220 may form the channels 208 that extend in the axial direction 140. For example, intersecting walls 220 forming a channel 222 extending in the axial direction 140 are shown by dashed lines for illustration. A maximum cross-sectional dimension perpendicular to the axial direction 140 is indicated by maximum dimension 230. For example, when the cross-section of the first end face 214 of the green honeycomb structure 101 is circular, the maximum dimension 230 may be a diameter of the circular first end face 214. When the cross-section of the first end face 214 of the green honeycomb structure 101 is rectangular, the maximum dimension 230 may be a diagonal of the rectangular first end face 214. In other embodiments, the cross-section of the first end face 214 can be elliptical, race-track shape, square, rectangular non-square, triangular, hexagonal, octagonal, asymmetrical, symmetrical, or other desired shapes, and combinations thereof. When a desired length 216 is extruded, the green honeycomb structure 101 can be cut by any suitable means, such as wire cutting, chopping, or the like to form a green honeycomb body. The green honeycomb body 101 may be dried and fired via conventional methods to form a honeycomb body. While extrusion is illustrated as being horizontally oriented in FIGS. 1 and 2, this disclosure is not so limited and extrusion can be horizontal, vertical, at some incline thereto.

Average cell density of the green honeycomb body formed from the green honeycomb structure 101 may be between about 100 cells per square inch (cpsi) and about 900 cpsi (between about 15.5 and about 139 cells per square cm). The intersecting walls 220 may have transverse thicknesses ranging from about 3.0 mils to 60 mils (about 0.076 mm to 1.52 mm). For example, the geometries of the green honeycomb structure 101 may have an average cell density of 400 cpsi with a wall thickness of about 8 mils (400/8) or with a wall thickness of about 6 mils (400/6). Other geometries of the green honeycomb structure 101 include, for example, combinations of average cell density/wall thickness of 100/17, 200/12, 200/19, 270/19, 600/4, 400/4, 600/3, 900/3, and the like.

Upon exiting the extruder 100 in the axial direction 140, the green honeycomb structure 101 may stiffen and comprise a honeycomb network 226 of axially extending and intersecting walls 220 that form the axially-extending channels 222 and the axially-extending outer peripheral surface 210. The outer peripheral surface 210 may be an integrally formed co-extruded skin. The green honeycomb structure 101 can be cut or otherwise formed into a green honeycomb bodies.

Figure 3:
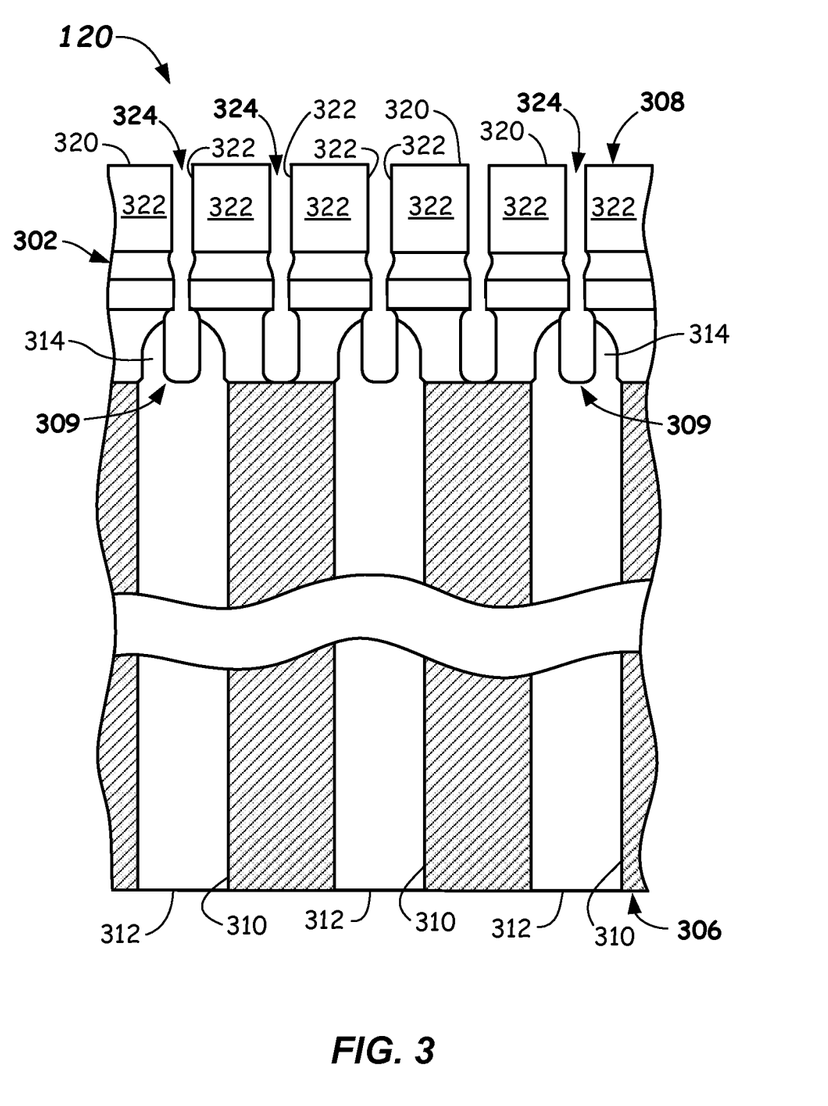
FIG. 3 illustrates a partial, cross-sectional view of an extrusion die including relatively-shallow divots in side surfaces of die pins forming slots, the extrusion die also including plenums located proximate slot inlets according to embodiments.
Figure 4:
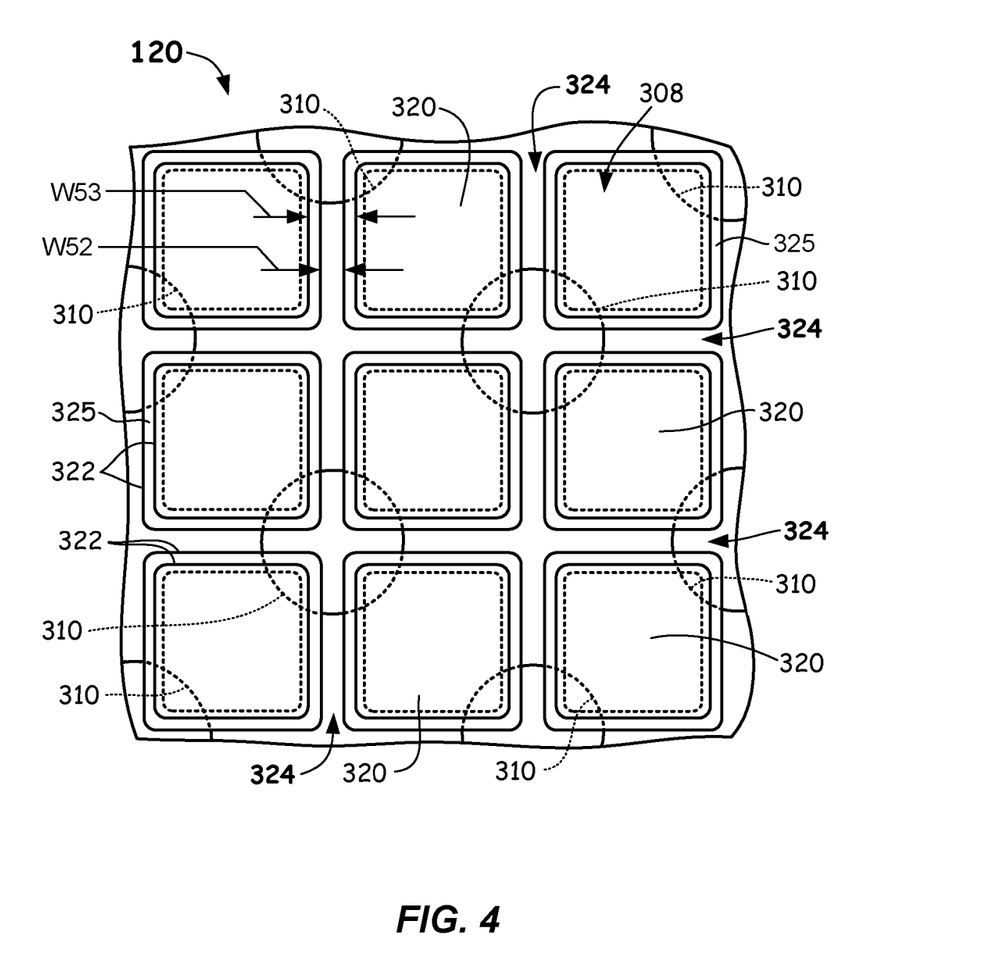
FIG. 4 illustrates a front, plan view of a portion of an extrusion die comprising plenums located proximate slot inlets, and a plurality of feedholes in fluid communication with the slots according to embodiments.

Additional reference is now made to FIGS. 3 and 4. FIG. 3 shows a partial, cross-sectional view of the extrusion die 120. FIG. 4 shows an enlarged front view of a portion of an outlet face 308 of the extrusion die 120. For example, the view of FIG. 4 may be a central portion of the outlet face 308 of the extrusion die 120 and not an area proximate the periphery of the outlet face 308. The extrusion die 120 may comprise an inlet face 306 located opposite the outlet face 308. The extrusion die 120 may further comprise a die body 302 extending between slot inlets 309 and the outlet face 308. The extrusion die 120 may also comprise a plurality of feedholes 310 that comprise feedhole inlets 312 and feedhole outlets 314. Batch material 116 (FIG. 1) enters the feedhole inlets 312 under pressure provided by the extruder 100 (FIG. 1) and is discharged at the feedhole outlets 314 as described herein.

The die body 302 may comprise a plurality of die pins 320 ("pins"—a few labeled), wherein each of the pins 320 may comprise one or more side surfaces 322. The pins 320 are arranged so that the side surfaces 322 (including four side surfaces for square-shaped pins 320) form a plurality of slots 324 (a few labeled) located between the side surfaces 322 of the pins 320. The slots 324 may intersect with the feedhole outlets 314 of the feedholes 310 and may extend to the outlet face 308. During extrusion, the slots 324 form the intersecting walls 220 (FIG. 2) when the batch material 116 (FIG. 1) is extruded through the extrusion die 120. In the embodiment depicted in FIGS. 3 and 4, the pins 320 are square-shaped when viewed in transverse cross-section as shown in FIG. 4. The square-shaped pins 320 form square-shaped channels 208 (FIG. 2). In other embodiments, the pins 320 may have different shapes in transverse cross-section, such as triangular, rectangular, hexagonal, or the like and they may comprise filleted or radiused corners when viewed in transverse cross-section.

During use of the extrusion die 120, the batch material 116 is forced under pressure against the inlet face 306 and enters the feedhole inlets 312 of the feedholes 310. The batch material flows to the feedhole outlets 314 of the feedholes 310 and into the slot inlets 309 (a few labeled). Batch material 116 emitted from the feedhole outlets 314 of the feedholes 310 flows into the slot inlets 309 and through the slots 324. The batch material knits together in the slots 324 to form the intersecting walls 220 (FIG. 2) and channels 208 of the green honeycomb structure 101. As described above, the slots 324 are formed by adjacent side surfaces 322 of adjacent pins 320. As described herein, contours formed in the side surfaces 322 may cause the widths of the slots 324 to vary over their lengths, which can desirably change the flow characteristics of the batch material being extruded through the slots 324. For example, the contours may include features (e.g., relatively-shallow divots and plenums) that change the flow characteristics of the batch material 116 through the slots 324.

Figure 5:
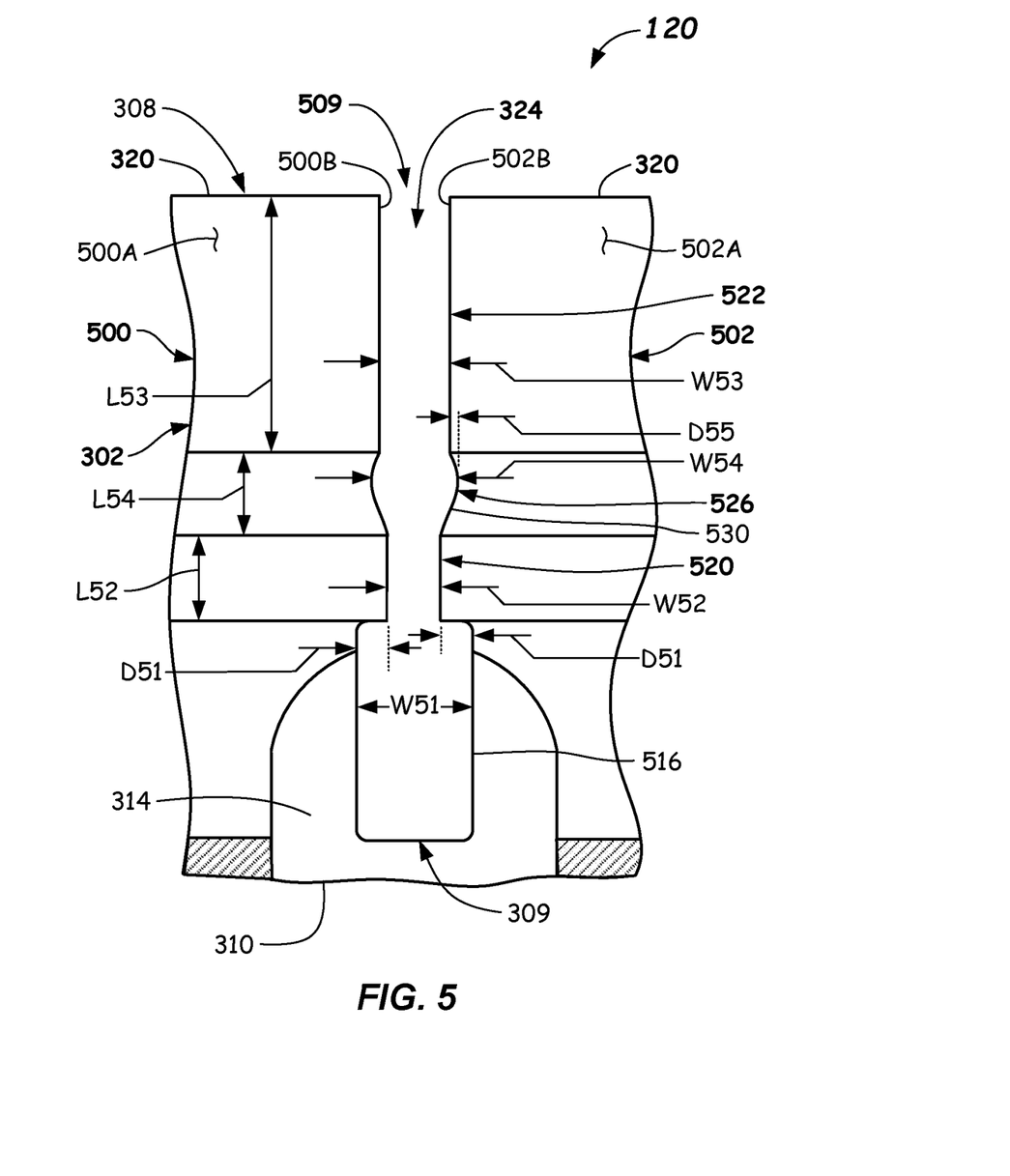
FIG. 5 illustrates a side cross-sectional view of a portion of an extrusion die slot comprising relatively-shallow divots in side surfaces of pins forming the extrusion die slot and a plenum located proximate the slot inlet according to embodiments.

Additional reference is made to FIG. 5, which shows an enlarged partial cross-sectional view of the extrusion die 120 comprising two adjacent pins 320, referred to as a first pin 500 and a second pin 502. The first pin 500 has a side surface 500A and a side surface 500B visible from the view of FIG. 5 and the second pin 502 has a side surface 502A and a side surface 502B visible from the view of FIG. 5. The side surface 500B and the side surface 502B face each other and form a slot 324. The slot 324 may extend between a slot exit 509 on the outlet face 308 and the slot inlet 309 located proximate or adjacent the feedhole outlet 314 of a feedhole 310. During extrusion, batch material 116 may flow out of the feedhole outlet 314, into the slot inlet 309, through the slot 324 and out of the slot exit 509. Another slot (not labelled) may be partially formed by the side surface 500A and the side surface 502A and may intersect with the slot 324. Batch material in both slots may knit together to form continuous walls 220 (FIG. 2) and channels 208 in the honeycomb structure 101.

Contours (e.g., plenums and relatively-shallow divots) in the side surfaces 500B and 502B forming the slot 324 described herein may be located in a plurality or all the side surfaces 322 (FIGS. 3 and 4) forming the slots 324 in the die body 302 of the extrusion die 120. The contours control certain characteristics of the flow of the batch material during extrusion as described herein.

As shown in FIG. 5, the slot 324 may comprise a plenum 516 located adjacent the feedhole outlet 314 of the feedhole 310 and at the slot inlet 309. A plenum 516 can comprise a portion of a slot (e.g., slot 324) that is in parallel with and wider than one or more other portions of the slot (e.g., slot 324) located above the plenum 516. For example, the plenum 516 of the slot 324 may be adjacent a portion of the slot 324 that is narrower than the plenum 516. The plenum 516 depicted in FIG. 5 may have a plenum width W51 extending between the side surface 500B and the side surface 502B. The plenum 516 may have a plenum depth D51, which is the distance the plenum 516 extends into the side surfaces 500B, 502B of the pins 500, 502 relative to adjacent narrower portions of the slot 324. The plenum 516 may be the first feature or contour in the slot 324 encountered by the batch material 116 upon exiting the feedhole outlet 314 of the feedhole 310.

The slot 324 depicted in FIG. 5 may further comprise two slot portions, a first slot portion 520 and a second slot portion 522. The side surface 500A and the side surface 502B may be parallel relative to each other in the first slot portion 520 and the second slot portion 522, for example. The first slot portion 520 may be located adjacent the plenum 516 and may be used as a reference for measuring the plenum depth D51. The first slot portion 520 may have a slot width W52 and a slot length L52. In the embodiment depicted in FIG. 5, the width W51 of the plenum 516 is greater than the width W52 of the first slot portion 520. The second slot portion 522 may have a slot width W53 and a slot length L53. In some embodiments, the slot length L53 may be greater than the slot length L52, for example. The slot width W53 may be greater than the slot width W52, such that the second slot portion 522 constitutes a halo cut 325 in the slot 324 as shown in FIG. 4.

The slot 324 may comprise a divot 526 in the side surface 500B and the side surface 502B between the slot inlet 309 and the slot exit 509. A divot (e.g., divot 526) is a wide portion of a slot (e.g., slot 324) that is adjacent two narrower slot portions. The portion of a slot (e.g., slot 324) constituting a divot (e.g., divot 526) may comprise a maximum width in the divot that is greater than widths of either of the two adjacent slot portions (e.g., slot portions 520, 522). The depth of the divot 526 into a side surface (500A, 500B, 502A, 502B) of a pin 500, 502 may increase gradually as shown by the divot 526 or, in some embodiments, the depth may increase as a step function. Divots may comprise other recessed shapes than those described herein. In some embodiments, the depth of a divot (e.g., divot 526) is measured as its depth D55 into a side surface (e.g., side surface 500B, side surface 502B, side surface 500A, or side surface 502A) of a pin 320 as described below. The divot 526 may have a length L54 extending between the first slot portion 520 and the second slot portion 522. In some embodiments, the length L54 may be between 8.0 mils and 12.0 mils (0.20 mm and 0.30 mm). In other embodiments the length L54 may be between 9.0 mils and 11.0 mils (0.23 mm and 0.30 mm). The slot 324, in the portion of the divot 526, may have a width W54 as measured across the deepest portion of the divot 526.

Figure 6:
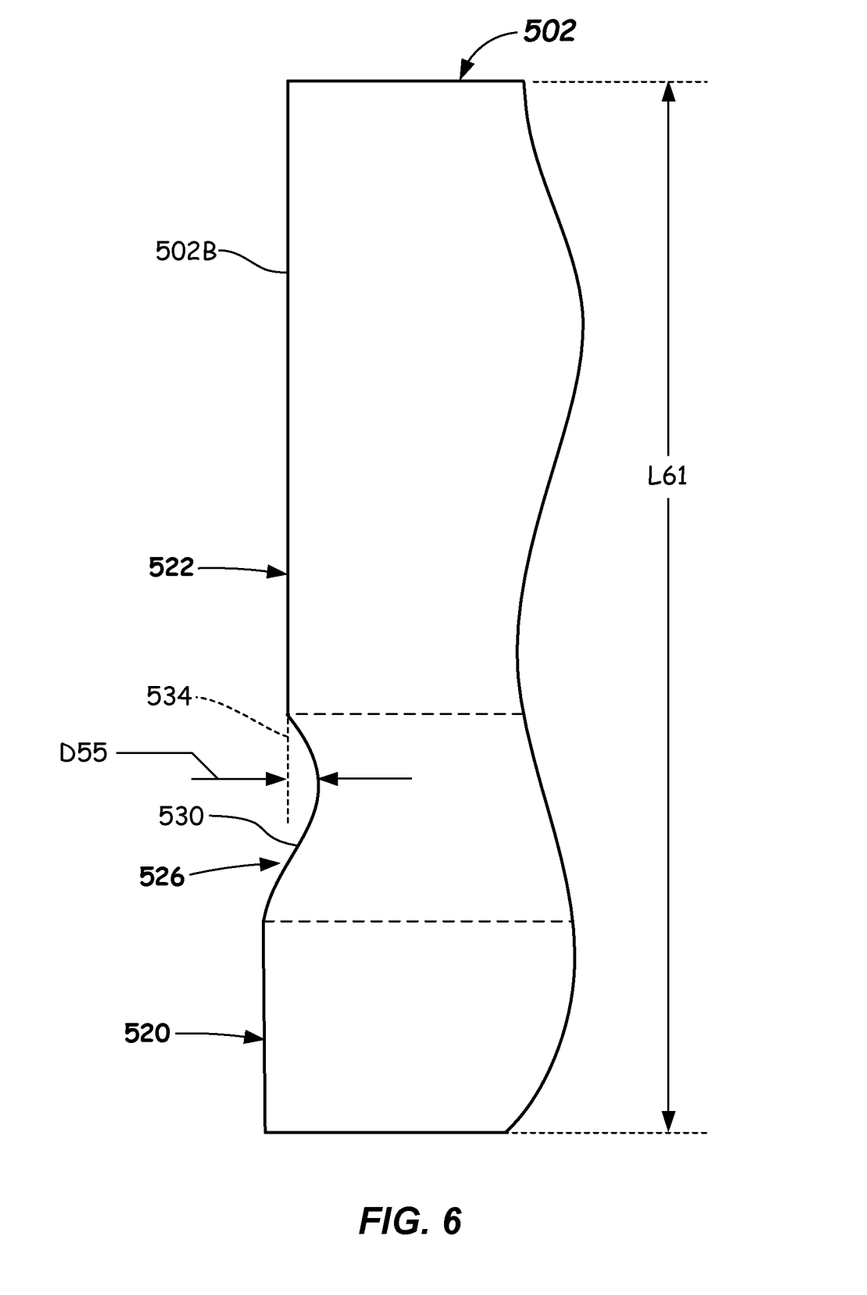
FIG. 6 illustrates an enlarged side cross-sectional view of a portion of a side surface of a die pin forming a slot, the side surface comprising a relatively-shallow divot extending into the side surface according to embodiments.

Additional reference is now made to FIG. 6, which shows an enlarged, partial view of a portion of the pin 502. The portion of the pin 502 shown in FIG. 6 extends between the first slot portion 520 and the second slot portion 522 and has a length L61. The embodiment of the divot 526 depicted in FIG. 6 comprises a curved portion 530 that may be exaggerated for illustration purposes. The divot 526 may have a divot depth D55 extending into the side surface 502B of the pin 502. The divot depth D55 may be a maximum distance between a reference line 534 extending from a portion of the side surface 502B adjacent the divot 526 and the deepest portion of the divot 526, which in FIG. 6 is the deepest portion of the curved portion 530. In some embodiments, the divot depth D55 may be less than or equal to 2.0 mils (50 µm). In other embodiments, the divot depth D55 is between 1.8 mils and 3.3 mils. In yet other embodiments, the divot depth D55 is between 1.8 mils and 3.5 mils. The divot depth D55 may, in some embodiments, be less than or equal to 3.5 mils (89 µm).

In some embodiments, the characteristics of the divot 526 are expressed as a ratio between the slot exit width W53 (FIG. 5) of the second slot portion 522 and the divot depth D55 (i.e., W53/D55). In some embodiments, the ratio of W53/D55 is 1.3 or greater. In other embodiments, the ratio of W53/D55 is 1.2 or greater. In other embodiments, the ratio of W53/D55 is 1.7 or greater, or even 2.5 or greater. Reference is made to Table 1, where different slot widths (W53), divot depths (D55), and ratios W53/D55 between the slot widths and divot depths are described. It is noted that in the example of Table 1, the maximum divot depth D55 is 3.5 mils (89 µm).

TABLE 1

| relationships between W53/D55 | | |
|---|---|---|
| Slot Width W53 Mils (um) | Divot Depth D55 Mils (um) | Ratio of W53/D55 |
| 2.5 (61) | 2.0 (51) | 1.3 |
| 3.3 (84) | 2.0 (51) | 1.7 |
| 4.3 (110) | 2.5 (61) | 1.7 |
| 5.0 (130) | 2.5 (61) | 2.0 |
| 6.0 (150) | 3.0 (76) | 2.0 |
| 6.5 (170) | 3.0 (76) | 2.2 |
| 7.0 (180) | 3.5 (89) | 2.0 |
| 8.0 (200) | 3.5 (89) | 2.3 |
| 9.0+ (230+) | 3.5 (89) | >2.5 |

In some embodiments, the dimensions of the divots 526 are defined as ratios of their divot lengths L54 to their divot depths D55. In some embodiments, the ratio (L54/D55) is greater than 3.0 and in other embodiments, the ratio (L54/D55) is between 3.0 and 7.0. In yet other embodiments, the ratio (L54/D55) is between 4.0 and 7.0 or even between 4.5 and 5.5.

Reference is made to Table 2, which shows example dimensions of the slot 324 (FIG. 5) and example dimension of the divot 526. Two different extrusion die types are provided in Table 2, a 600/3 extrusion die and a 900/3 extrusion die.

TABLE 2

| Extrusion Die Comparisons | | |
|---|---|---|
| Dimension | Disclosed 600/3 Die | Disclosed 900/3 Die |
| Slot second portion Length L53 | 48.3 mils 1.23 mm | 30 mils 0.76 mm |
| Slot Width W53 | 3.3 mils 0.084 mm | 3.1 mils 0.079 mm |
| Slot Length L61 | 105 mils 2.67 mm | 80 mils 2.03 mm |
| Divot Length L54 | 10.3 mils 0.262 mm | 10.1 mils 0.257 mm |
| Divot Depth D55 | 2.0 mils 0.051 mm | 2.0 mils 0.051 mm |
| Feed Hole Diameter D51 | 42 mils 1.07 mm | 42 mils 1.07 mm |
| Plenum Depth W51 | 13.3 mils 0.338 mm | 12.9 mils 0.338 mm |
| Plenum Length L51 | 40 mils 1.02 mm | 30 mils 0.762 mm |

Reference is made to Table 3, which illustrates some extrusion die sensitivity parameters for the extrusion dies described in Table 2.

TABLE 3

| Extrusion Die Sensitivity factors | | |
|---|---|---|
| Parameter | Disclosed 600/3 Die | Disclosed 900/3 Die |
| Extrusion Velocity | 1 inch/sec 2.54 cm/sec | 1 inch/sec 2.54 cm/sec |
| Defect Hole Radius | 20.7 mils 0.53 mm | 20.7 mils 0.53 mm |
| Plate Hole Radius | 18.5 mils 0.47 mm | 18.5 mils 0.47 mm |
| Average Velocity | 0.9954 in/s 2.528 cm/s | 0.9962 in/s 2.530 cm/s |
| Maximum Velocity | 0.9979 in/s 2.535 cm/s | 1.004 in/s 2.550 cm/s |
| Minimum Velocity | 0.9948 in/s 2.527 cm/s | 0.9686 in/s 2.507 cm/s |
| Velocity Difference (dV) | 0.3024% | 3.564% |
| Pressure drop | 2849.5 psi 19.646 MPa | 2475.9 psi 17.071 MPa |

Referring to Table 3, the disclosed extrusion dies according to embodiments disclosed herein have much better extrusion characteristics than traditional extrusion dies. For example, velocity difference (dV) is much lower with the extrusion dies disclosed herein. In addition, the die pressure to achieve an extrusion velocity of approximately 1.0 inch/sec (2.54 cm/sec) is significantly less with the extrusion dies disclosed herein.

The extrusion die 120, comprising the divot 526, may be manufactured by wire-electrical discharge machining (wire-EDM) technique. The fabrication time and cost of the extrusion die 120 may be proportional to the divot size. Because the divots disclosed herein are relatively shallower than traditional divots, fabrication of the extrusion die 120 requires much less time and cost than a traditional extrusion die with a traditional divots.

Figure 7:
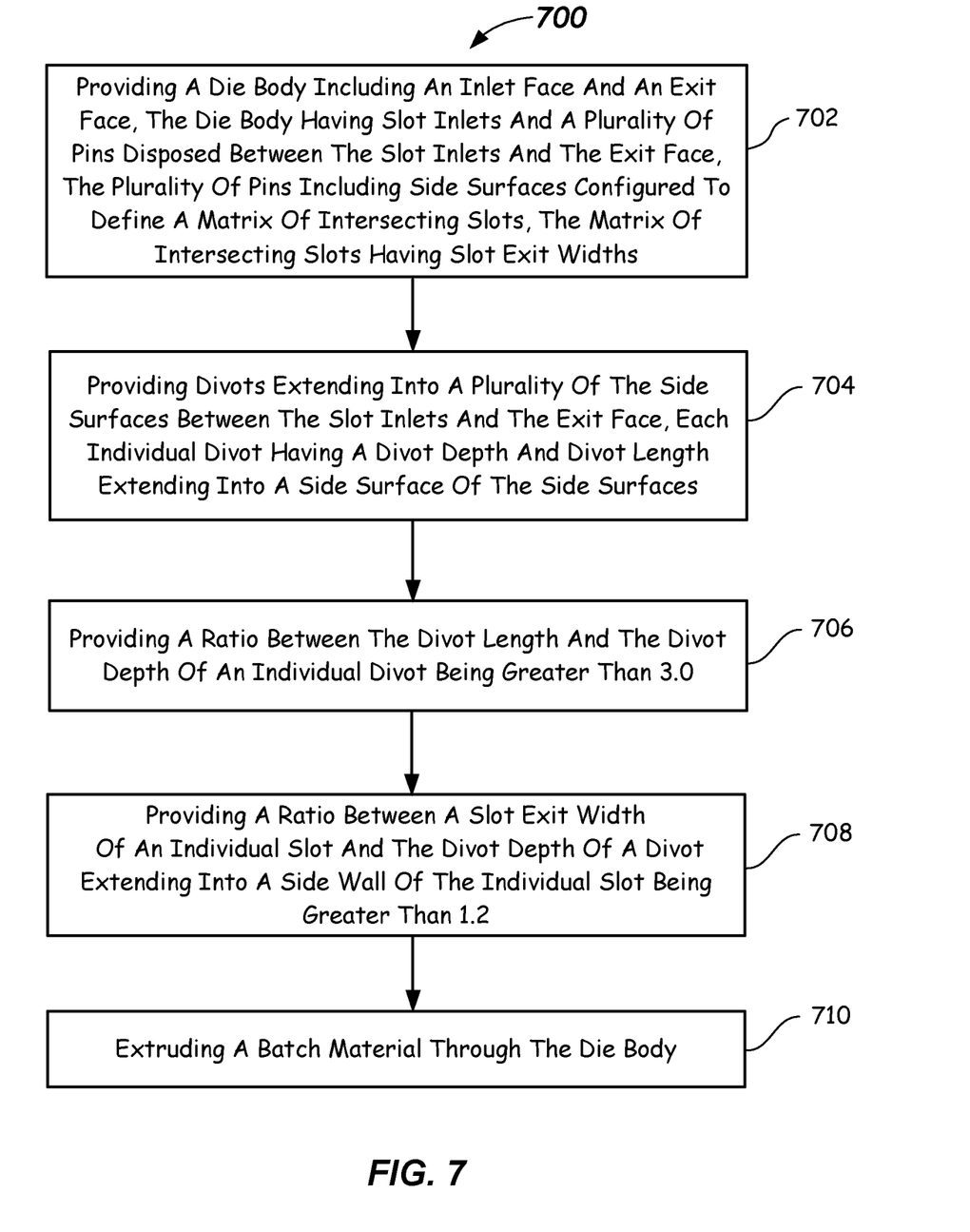
FIG. 7 illustrates flowchart describing a method of forming a honeycomb structure using any of the extrusion dies of FIGS. 1-6 according to embodiments.

In another aspect, a method of forming a honeycomb structure is disclosed. Reference is made to FIG. 7, which shows a flowchart 700 FIG. 7 that describes a method of forming a honeycomb substrate using the extrusion dies of FIGS. 1-6. The flowchart 700 includes, in 702, providing a die body (e.g., die body 302) comprising an inlet face (e.g., inlet face 306) and an exit face (e.g., exit face 308), the die body having slot inlets (e.g., slot inlets 309) and a plurality of pins (e.g., pins 320) disposed between the slot inlets and the exit face, the plurality of pins comprising side surfaces (e.g., side surfaces 322) configured to define a matrix of intersecting slots (e.g., slots 324), the matrix of intersecting slots having slot exit widths (e.g., widths W53). The flowchart 700 includes, in 704, providing divots (e.g., divot 526) extending into a plurality of the side surfaces between the slot inlets and the exit face, each individual divot having a divot depth (e.g., depth D55) and divot length (e.g., length L54) extending into a side surface of the side surfaces. The flowchart 700 includes, in 706, providing a ratio (L54/D55) between the divot length (L54) and the divot depth (D55) of an individual divot being greater than 3.0. The flowchart 700 includes, in 708, providing a ratio between a slot exit width (W53) of an individual slot and the divot depth (D55) of a divot (e.g., divot 526) extending into a side wall of the individual slot being greater than 1.2. The flowchart 700 includes, in 710 extruding a batch material (e.g., batch material 116) through the die body 302.

It will be apparent to those skilled in the art that various modifications and variations can be made in the present disclosure without departing from the scope of the disclosure. Thus, it is intended that the appended claims cover the modifications and variations of this disclosure provided they come within the scope of the appended claims and their equivalents.

What is claimed is:

1. A honeycomb extrusion die comprising:
   a die body comprising an inlet face and an exit face, the die body having slot inlets and a plurality of pins disposed between the slot inlets and the exit face, the plurality of pins comprising a plurality of side surfaces configured to define a matrix of intersecting slots;
   divots extending into the plurality of side surfaces between the slot inlets and the exit face, each individual divot having a divot depth and a divot length extending into a respective side surface of the plurality of side surfaces; and
   a ratio between a divot length and a divot depth of an individual divot being greater than 3.0.

2. The honeycomb extrusion die of claim 1 wherein the ratio between the divot length and a divot depth of an individual divot is between 3.0 and 7.0.

3. The honeycomb extrusion die of claim 1 wherein the ratio between the divot length and a divot depth of an individual divot is between 4.5 and 5.5.

4. The honeycomb extrusion die of claim 1 wherein the divot depth of one or more divots is between 1.8 mils and 3.5 mils.

5. The honeycomb extrusion die of claim 1 wherein the divot depth of one or more divots is less than or equal to 2.0 mils.

6. The honeycomb extrusion die of claim 1 wherein the divot length of one or more divots is between 8.0 mils and 12.0 mils.

7. The honeycomb extrusion die of claim 1 wherein the divot length of one or more divots is between 9.0 mils and 11.0 mils.

8. The honeycomb extrusion die of claim 1 further comprising plenums coupled to the slot inlets, the plenums being coupled to the matrix of intersecting slots.

9. A honeycomb extrusion die comprising:
   a die body comprising an inlet face and an exit face, the die body having slot inlets and a plurality of pins disposed between the slot inlets and the exit face, the plurality of pins comprising a plurality of side surfaces configured to define a matrix of intersecting slots, the matrix of intersecting slots having slot exit widths;
   divots extending into the plurality of side surfaces between the slot inlets and the exit face, each individual divot having a divot depth and a divot length extending into a respective side surface of the plurality of side surfaces;
   a ratio between the divot length and the divot depth of an individual divot being greater than 3.0; and
   a ratio between a slot exit width of an individual slot and the divot depth of a divot extending into a side wall of the individual slot being greater than 1.2.

10. The honeycomb extrusion die of claim 9 wherein the ratio between the divot length and the divot depth of an individual divot is between 4.0 and 7.0.

11. The honeycomb extrusion die of claim 9 wherein the ratio between the divot length and the divot depth of an individual divot is between 4.5 and 5.5.

12. The honeycomb extrusion die of claim 9 wherein the divot depth of one or more divots is between 1.8 mils and 3.5 mils.

13. The honeycomb extrusion die of claim 9 wherein the divot depth of one or more divots is between 1.8 mils and 3.3 mils.

14. The honeycomb extrusion die of claim 9 wherein the divot depth of one or more divots is less than 2.0 mils.

* * * * *